United States Patent [19]

Desiro

[11] Patent Number: 4,462,146

[45] Date of Patent: Jul. 31, 1984

[54] RADIATOR RECORING FIXTURING AND TOOLS

[76] Inventor: Richard Desiro, 42995 Ambridge, Northville, Mich. 48167

[21] Appl. No.: 521,948

[22] Filed: Aug. 10, 1983

Related U.S. Application Data

[62] Division of Ser. No. 268,551, Jun. 1, 1981, Pat. No. 4,411,414.

[51] Int. Cl.³ .................................................. B23P 11/00
[52] U.S. Cl. ...................................... 29/243.5; 72/384
[58] Field of Search ............................ 29/243.5; 72/384

[56] References Cited

U.S. PATENT DOCUMENTS

| | | | |
|---|---|---|---|
| 2,799,192 | 7/1957 | Harding | 72/384 |
| 3,914,845 | 10/1975 | Olsson | 29/243.5 |
| 4,112,571 | 9/1978 | Coutant | 29/243.5 |

Primary Examiner—James L. Jones, Jr.
Attorney, Agent, or Firm—Remy J. VanOphem

[57] ABSTRACT

Fixturing for repair of automobile radiators is disclosed, usable for recoring of either brass or plastic tank radiators, including clamping gates providing parallel rails adjustably spaced to receive the radiator header with an air cylinder exerting clamping pressure on the tank top. The radiator sits atop the rails of a first set of clamping gates when resoldering conventional tanks and is recessed between the rails of a second set of clamping gates which are alternatively installed for decrimping and crimping of the header tabs of plastic tank radiators. Decrimping and crimping hand tools of special configuration are also disclosed, cooperating with the rails during use.

7 Claims, 11 Drawing Figures

RADIATOR RECORING FIXTURING AND TOOLS

This is a division, of application Ser. No. 268,551, filed June 1, 1981 now U.S. Pat. No. 4,411,414.

BACKGROUND OF THE INVENTION

Field of the Invention

The invention concerns repair of automotive radiators and more particularly concerns fixturing and hand tools for recoring radiators.

In the course of repairing such radiators, a recoring is often found to be necessary in which the tube-and-fin "core" of the radiator is removed from the top and bottom tanks. Conventional radiator construction includes a tank joined to the core by means of a header which receives the core tubes and forms the bottom of the tank when the tank is mounted within the header. The most common radiator construction currently employed includes a brass tank which is soldered to the header and in recoring the radiator, the soldered joint is loosened for removal of the tank, and upon recoring, the tank is placed into the header and the solder connection rerun.

Recently there has developed a trend towards replacement of the brass tank with a plastic tank mechanically joined to the header. The plastic tank is positioned against a gasket received in a header recess, a tank flange compressed against the gasket and secured in position with a series of tabs formed integrally with the header, which are bent down to retain the tank compressed against the gasket.

Radiator repair shops have for the most part relied on impromptu fixturing for conducting these operations.

Reassembly of the brass tank to the header has often involved difficulties due to deformation of the tank bottom or slight irregularities in the header recess receiving the tank lip, such that degree of pressure is necessary in order to get the tank to properly seat. In addition, there sometimes exists excessive clearance between the tank lip and the header tank recess, in turn, resulting in a weaker solder joint. The handling of the disassembly and reassembly of the tank and radiator core and header is relatively difficult and slows completion of the recoring.

Plastic tank designs have presented their own peculiar problems in recoring, particularly in crimping and decrimping of the tabs while properly insuring a seal of the tank bottom against the gasket and the header.

The crimped tabs are difficult to loosen because they are often jammed tightly into the plastic tank flange, with minimal clearance between the tank side wall and the tab end, making it difficult to obtain insertion of a tool for decrimping. The compression of the tank against the gasket further aggravates the problem due to the tightness with which the tabs are forced against the tank flange.

To obtain a proper seal between the header and tank is also troublesome since, if the header recess receiving the gasket is deformed, leakage will often occur. Such deforming can be inflicted by the decrimping operation or the subsequent crimping operation due to pressure exerted by hand tools on the outer edge of the header.

In addition, the entire tank crimping and decrimping operations are relatively time consuming, thereby increasing the cost of labor to recore.

Previous attempts at improving fixturing have generally not alleviated the time problem and involve relatively costly fixturing which has not successfully speeded up the disassembly or assembly steps. It has also not satisfactorily handled the problem of insuring leak free connections from the tank to the header.

In addition, those in the radiator repair industry are faced with the task of being prepared to repair efficiently both the conventional brass tank and the newer plastic tank radiator recoring.

Such plastic tanks are, in the United States, only now beginning to be found in numbers, but ultimately may account for the bulk of radiator repairs.

In the interim both types of radiators will necessarily need to be accommodated. Such fixturing device being relatively costly, it represents a sizable capital investment for businesses having the limited financial resources of a typical radiator repair shop, and it is important that any fixturing intended for that application be adaptable to both tank mounting styles.

The decrimping and crimping tools heretofore employed have either been conventional hand tools such as vise grips pressed into service for this purpose or have been specially designed pneumatic tools. In the case of the conventional hand tools, these do not efficiently perform the crimping and decrimping operations and therefore require excessive labor. The pneumatic tools, on the other hand, are relatively difficult to control and often apply excessive force to the tab due to a lack of "feel" associated with their manipulation.

Accordingly, it is an object of the present invention to provide fixturing for recoring of radiators which is adaptable to both conventional and plastic tank construction and which further is adaptable to the wide variety of radiator tank sizes and configurations that exist such that a simple universal fixture can be employed to be useful in recoring radiators of all types.

A further object of the present invention is to provide such fixturing which greatly facilitates the recoring operation of both metal and plastic tank radiator construction.

It is still another object of the present invention to provide decrimping and crimping hand tools for use with the fixturing in order to efficiently and rapidly conduct the crimping and decrimping steps incidental to recoring of the plastic tanks.

SUMMARY OF THE INVENTION

These and other objects of the present invention, which will become apparent upon a reading of the following specification and claims, are achieved by fixturing essentially consisting of first and second sets of adjustably mounted rails which are of two differing configurations, one each adapted to conventional tank radiators and the other to the plastic tank radiator construction, respectively. The rails are adapted to receive the radiator header, with an air cylinder hold down arrangement adapted to exert pressure on the top of the tank in both the conventional and plastic tank applications. In the conventional tank construction, the rails are configured such that the radiator header sits atop each side rail, while in the plastic tank application configuration, a recess is provided with the header received thereinto to be roughly even with the top surface of the rails to provide protection for the header seal channel and to cooperate with the crimping and decrimping hand tools.

The pairs of rails are supported by pairs of pivoted arms downwardly extending from a cross member to form clamping gates, swingably mounted for movement toward and away from each other so as to be adjustable to radiator headers of varying widths. Mounted atop the cross member is an air cylinder having a downwardly extending operating rod to which is pinned a cross bar slidably receiving a pair of tee-shaped hold down elements, each of the hold down elements being slidably received on the cross bar via elongated openings accommodating tilting as well as sliding movements thereof. Each of the hold down elements is adapted to be positioned at longitudinally spaced points atop the radiator tank when the radiator is positioned on the rails to secure the radiator in position.

The entire assembly of the rails, arms, cross member and air cylinder may be mounted for rotation by means of a bearing assembly to allow the radiator, when clamped in place, to be pivoted for ready access to the radiator from all sides by the repairman.

For this purpose, the assembly is mounted from above by a cantilevered beam supported on an upstanding frame section adapted to support the radiator above the shop floor at a convenient height.

For conventional brass tanks, the header sits atop each of the rails and the hold down elements are positioned to exert a pressure on the tank top, upon actuation of the air cylinder, forcing the tank lower edge or lip into a receiving header recess. The air cylinder pressure exerted causes the header lip to compress slightly about the edge to reduce the clearance space and improve the soldered connection.

In the plastic tank application, the first set of clamping gates are replaced with a second set having rails formed with a shoulder recess extending along the adjacent sides and top thereof, which is adapted to receive the header to place the tank flange roughly even with the top of the rails. The air cylinder and hold down fixtures compress the tank against the gasket and enable ready decrimping of the tabs forming a part of the header.

The decrimping tool which is employed preferably consists of a bar section with a handle at one end extending from one side of the section. The bar section is formed with a slot receiving a pivoted trigger rod. The opposite end of the bar section is formed with an oppositely extending anchor block, having a through bore receiving a spring-loaded plunger with one end engaged with the trigger rod such as to be caused to be extended forwardly of the anchor block. The anchor block is also formed with an inclined mounting surface to which is mounted a downwardly extending hook finger. A knob is also mounted atop the anchor block.

In use, the decrimping tool plunger is positioned against the rail, the hook finger in registry with the tab to be decrimped, the finger being inserted behind the tab end and the tank side, held down with pressure on the knob. Squeezing of the trigger rod and extension of the plunger produces outward pressure between the finger and the tab, and pivoting movement of the decrimping tool enables ready bending upwardly of each of the tabs.

The crimping tool consists of a handle-frame to which is joined an angled clevis, to which, in turn, is pivotally mounted a swing bar to which is affixed a finger-lever including a rearwardly extending lever rod and a forwardly extending finger. A channel block is mounted across the clevis ends and adapted to be positioned beneath the rails which are thereby positioned between the finger and the channel block. In use, the tool is positioned with the crimping finger in registry with a tab to be crimped, the lever rod manipulated downwardly while the handle is pulled upwardly to rotate the tool with respect to the rail and cause a neat rolling over of the tab into the crimped position.

DETAILED DESCRIPTION OF THE PREFERRED EMBODIMENT

In the following description certain specific terminology will be employed, and specific embodiments described in accordance with the requirements of 35 USC 112 but it is to be understood that the same is not intended to be limiting and indeed should not be so construed inasmuch as the invention is capable of taking many forms and variations within the scope of the appended claims.

Figure 1:
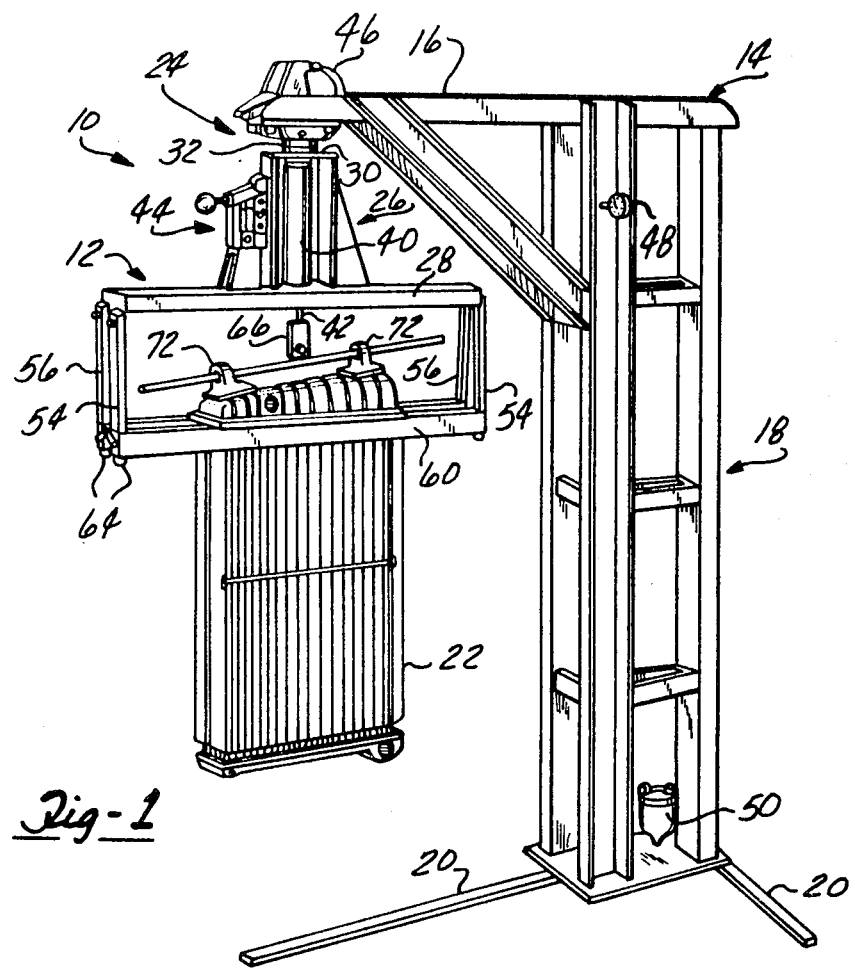
FIG. 1 is a perspective view of the fixturing according to the present invention.

Referring to the drawings and particularly FIG. 1, the fixturing 10 according to the present invention includes a clamping assembly 12 suspended from a support frame 14 which includes a cantilevered beam 16 extending outwardly from an upright framework adapted to be stably supported on a shop floor surface by outriggers 20. The clamping assembly 12 in this embodiment is designed to be rotatably mounted, as will be described herein, on the cantilevered beam 16 such as to enable ready access to a radiator 22.

The clamping fixturing includes a support bracket 26 welded to a cross beam 28. The support bracket 26 includes a top plate 30 and a collar 32 integral with a trunnion shaft 34, and a retaining collar 36 acting to suspend the clamping assembly 12 on a bearing assembly 24.

Figure 1A:
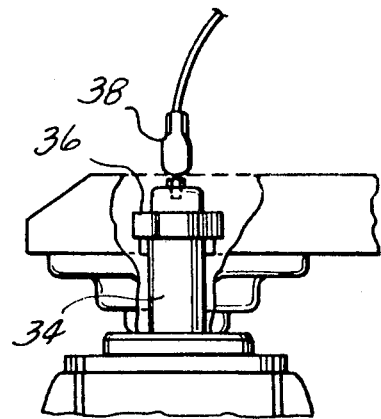
FIG. 1a is an enlarged, fragmentary and partially broken away view of a portion of the clamping fixturing shown in FIG. 1.

A suitable pneumatic swivel 38 (FIG. 1a) is provided allowing connection of the pneumatic lines to the air cylinder 40.

The air cylinder 40 is mounted intermediate the sides of the support bracket 26 as shown in FIG. 1 and atop the cross beam 28 with the actuating rod 42 extending through an opening in the cross beam 28 such as to extend therebelow. Control means 44 are also mounted to the support bracket 26 enabling selective actuation of the air cylinder 40 for up, down or neutral motion for control over movement of the actuating rod 42. The air cylinder 40 is supplied with air pressure via the air line 46 connected to a suitable pressure gage 48 and regulator, filter and lubricator 50.

The clamping assembly 12 also includes a pair of clamping gates 51 and 52 each swingably and detachably mounted on the cross beam 28 by pairs of downwardly extending arms 54 and 56 respectively pivoted on either end of the cross beam 28 with cap screws 58. Each of the clamping gates 51 and 52 also includes parallel side rails 60 and 62, respectively connected to the lower ends of the arms 54 and 56 by means of cap screws or bolts 64. The adjacent surfaces of the side rails 60 and 62 are squared off so as to insure that the header 76 edges will securely sit atop the side rails 60 and 62 evenly with radiator configurations having only limited overhand of the headers.

Figure 2:
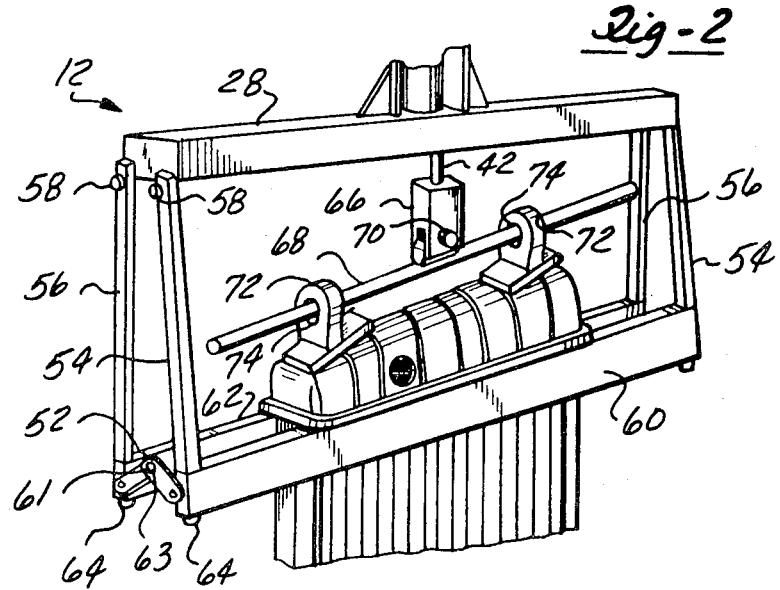
FIG. 2 is an enlarged view of the clamping fixture with a conventional radiator clamped in position.

A clevis end 66 is also provided for the actuating rod 42, which, in turn, is pinned at 70 to a clamping bar 68 as shown in FIG. 2. The clamping bar 68 has slidably disposed thereon a pair of hold down elements 72, each of which has an elongated opening 74 through which the clamping bar 68 passes and the elongation of which allows tilting movement, as best seen in FIG. 2, to accommodate the many variations of surface contours among differing models of radiators to be disposed therein.

This provides an extremely efficient and adaptable clamping arrangement and does not require separate fixturing for each of the great number of variations in tank top contours.

In addition, the disposition of the radiator 22 between the side rails 60 and 62, which are adjustably mounted for movement towards and away from each other, allows for accommodation of the differing widths and depths of radiators such as to constitute a "universal" fixture arrangement.

Figure 3:
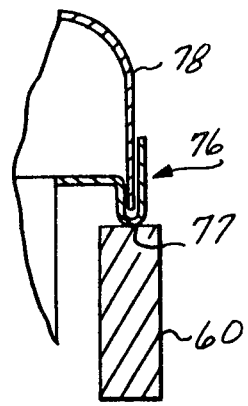
FIG. 3 is a perspective fragmentary view of the fixturing shown in FIGS. 1 and 2 with the radiator positioned therein for the making of the tank connections.

In order to secure the clamping gates 51 and 52 in adjusted positions, a toggle linkage 61 is pivotally mounted to each side rail 60 and 62, and pivotally mounted to each other with an adjustment bolt 63, tightening of which will maintain an adjusted position. This enables adjustment of the positions to accommodate the various radiator widths such as to correctly position the top surface of each of the side rails 60 and 62 in the case of usage for a conventional tank-header construction. As best been in FIG. 3, the lower edge 77 of the header 76 is positioned atop the rail 60. Thereafter, the control means 44 is actuated to cause the air cylinder 40 to be pressurized, forcing the hold down elements 72 against the top of the tank.

In use, a new core and header is positioned between the side rails 60 and 62, with the arms 54 and 56 swung into the correct position such that the header lower edge 77 sits atop either the side rail 60 or 62. The tank is positioned with the header lower edge 77 above the receiving recess formed by the outer lip of the header 76, as shown.

The control means 44 is then actuated such that the air cylinder 40 is pressurized, forcing the hold down elements 72 to force the tank 78 downward into the recess formed by the outer lip of the header 76. This overcomes any tendency for slight irregularities of contour to prevent reinsertion of the tank 78, with the uniform pressure exerted by the arrangement tending to provide excellent seating.

The pressure also tends to draw the header and tank bottom edge into closer juxtaposition, to reduce the clearance space and enable better solder connections to be made.

Figure 4:
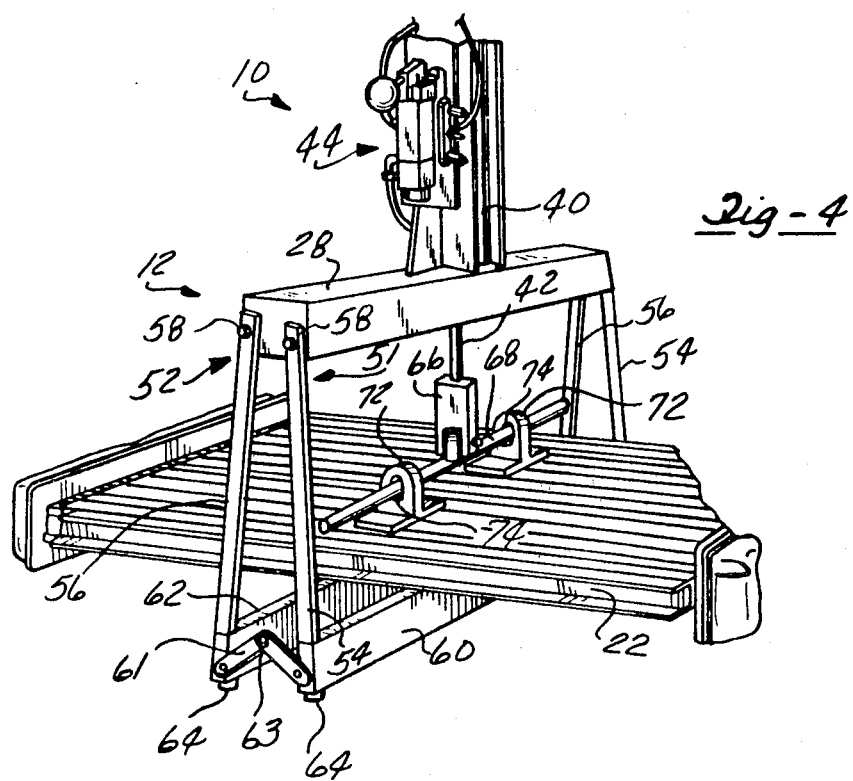
FIG. 4 is an enlarged partial perspective view of the rail and radiator tank and header depicting the relationship of the tank, header and rail configuration adapted for recoring of brass tank radiators.
Figure 5:
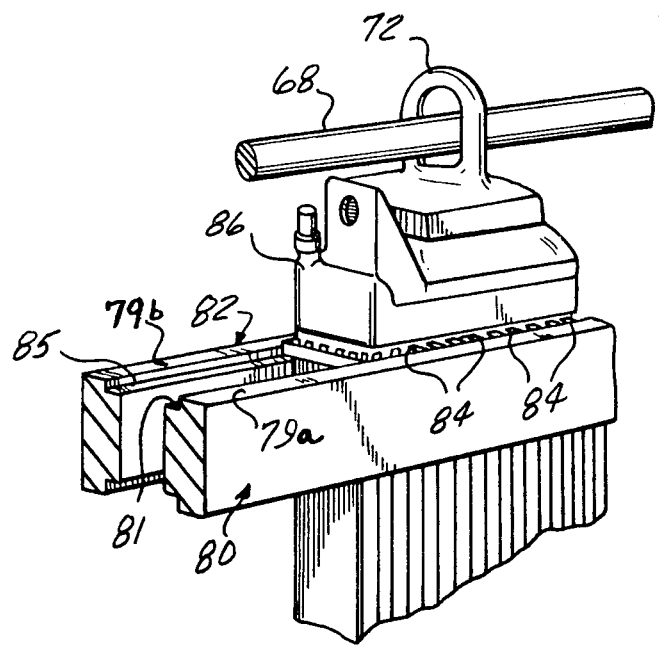
FIG. 5 is an enlarged fragmentary view of the rail and hold down elements showing a plastic tank therein.
Figure 6:
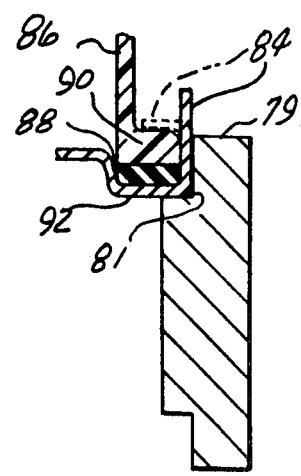
FIG. 6 is a fragmentary sectional view through the side rail tank and header illustrating the position of the plastic tank radiator installed in the fixturing according to the present invention.

The level of air pressure is adjustable by means of the regulator 50. The soldered joint may conveniently be made from one side by rotation of the radiator in the fixture through 360° to greatly enhance the workman's efficiency in executing this step. As seen in FIG. 4, the fixturing may also be advantageously employed to make the inlet and outlet soldered connections, by positioning the radiator on its face over the side rails 60 and 62 and actuating the air cylinder 40 to hold the radiator securely.

It is noted that soldering flux is corrosive to aluminum but adhesion of the solder to the rails must be avoided in order that the header is not soldered to the side rails 60 and 62. Thus, the side rails 60 and 62 are preferably constructed of stainless steel.

For this same reason, the same rails 60 and 62 are not suitable for use with both brass tank and plastic tank radiators, since the latter commonly employ aluminum headers. Also, the recessed construction of the rails to be employed for the plastic tanks, as will be described below, is not suitable for use with the soldered connection tanks.

In order to convert the fixturing to use with plastic tank radiators, the clamping gates 51 and 52 having the first set of side rails 60 and 62 are replaced with a second set of rails 80 and 82 having recesses 81 and 85 extending along their adjacent sides, such that the radiator header is disposed between the rails 80 and 82, and resting below the top surface of the rails 80 and 82 to position the tank flange 90 and crimped tabs 84 to be roughly even with the top surfaces 79a and 79b of each of the rails 80 and 82, respectively. The fixturing is utilized both for disassembly and assembly of the tank to the header and radiator core.

To disassemble, the tank 86 is engaged with the hold down elements 72 and the air cylinder 40 actuated to create a downward pressure on the tank upper surface. This compresses the gasket 88 normally included in plastic tank designs and enables the tabs 84 which are in the crimped position to be more readily decrimped by relieving the pressure on the tabs 84 and producing clearance at the inside edge of the tab 84 and between the tank flange 90 and the undersurface of the tab. The positioning of the header seal channel 92 within the rail recesses 81 and 85 with the pressure applied to the tank 86 insure that the tabs 84 can be decrimped with minimal possiblities of producing deformation or distortion of the header seal channel 92. In connection therewith, it is noted that the radiator construction in such plastic tank radiators includes a gasket 88 disposed within the header seal channel 92 and proper sealing thereof depends critically on the undistorted state of the header seal channel 92.

Figure 7:
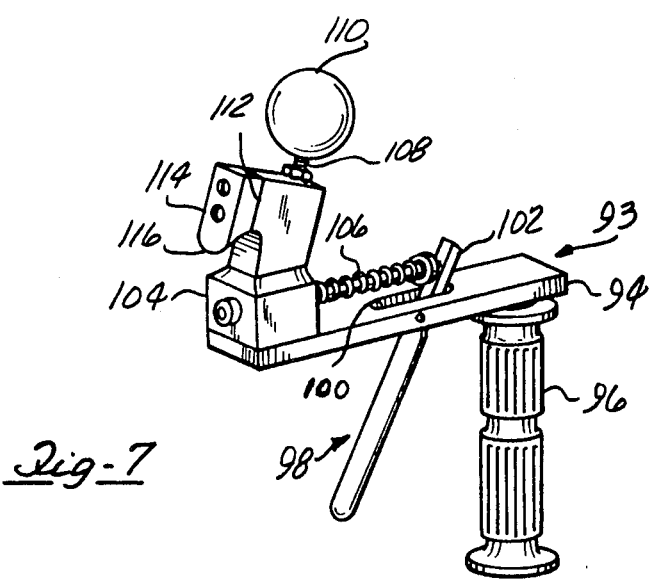
FIG. 7 is a view of the decrimping tool utilized with the fixturing according to the present invention.
Figure 8:
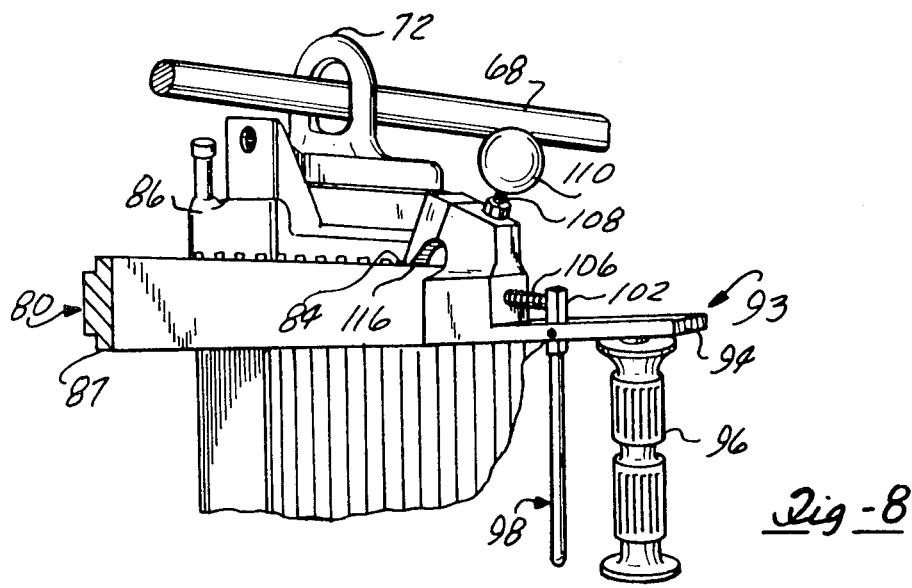
FIG. 8 is a perspective view of the decrimping tool of FIG. 7 shown in use.

Decrimping is executed by a specially designed tool shown in FIGS. 7 and 8. The decrimping tool 93 includes a tool frame consisting of an elongated generally rectangular-shaped aluminum bar section 94 having a gripping handle 96 extending at right angles to one end of the bar section. Intermediate the length of the bar section 94 is a pivotally mounted trigger rod 98, having a lower trigger portion covered with suitable grip and extending to be juxtaposed to the handle 96. The trigger rod 98 is received within an elongated slot 100 formed in the bar section 94 such as to accommodate pivoting movement thereof with an upper actuating portion 102 protruding above the top surface of the bar section opposite the handle 96. The bar section 94 at the opposite end from the handle 96 has welded thereto an anchor block 104 which is formed with a through bore receiving a spring loaded plunger 106 having one end disposed adjacent to the actuating portion 102 of the trigger rod 98, the opposite end protruding through the anchor block 104.

The anchor block 104 mounts knob 110 secured with a stud 108 threadably received in the upper surface of the anchor block 104. The anchor block 104 also has a mounting surface 112 inclined slightly to the plunger 106 axis which serves to anchor a pry finger 114 of hardened steel and having a sharp projecting rounded end 116 extending towards the plunger 106 end projecting through the anchor block 104.

In use, the air cylinder 40 is pressurized after placing the radiator in the fixturing to compress the gasket. As shown in FIG. 8, the user grasps the handle 96 and applies downward pressure on the knob 110, with the nose being in registry behind the tab 84 to be described. When the trigger rod 98 is squeezed, this forces the projecting end of the plunger 106 against the rail 80 or 82 producing a contact pressure therebetween, such that downward tilting of the tool 93 causes quick and efficient decrimping.

Since the header is completely recessed within the recess 81 or 85, there is no possiblity of distortion of the header seal channel 92. After decrimping, the tool 93 is simply successively moved along to the next tab 84 to continue the operation until all the side located tabs 84 are decrimped. The ends tabs 84 are decrimped with conventional hand tools. The tank 86 is then lifted free for the recoring operation, including replacement of the gasket 88.

The header seal channel 92 may also be trued while positioned within the rails 80 and 82 while resting in the fixturing by merely tooling the interior of the header seal channel 92, if any distortion has taken place.

The fixturing is also used to great advantage in reassembling the tank to the header and core by placing the tank 86 atop the gasket 88 and reactivating the air cylinder 40 to apply a uniform compression of the tank 86 on the gasket 88 prior to recrimping of the tabs 84.

Figure 9:
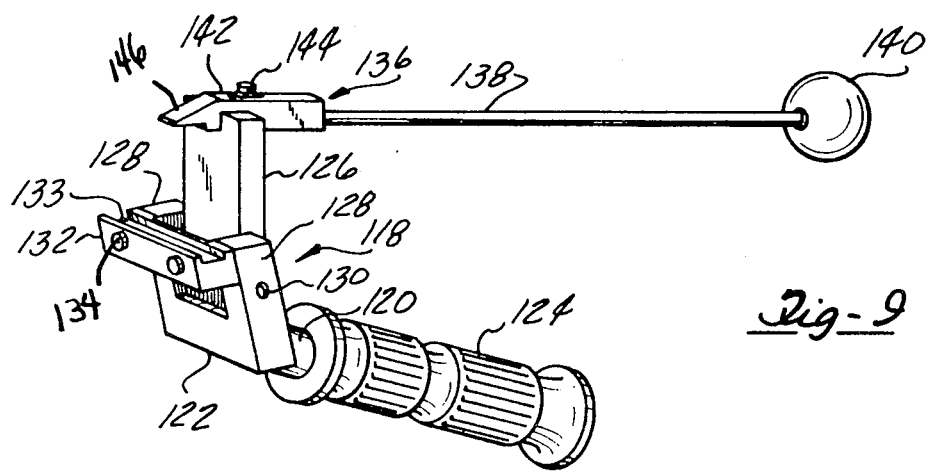
FIG. 9 is a perspective view of a crimping tool used with the fixturing according to the present invention.
Figure 10:
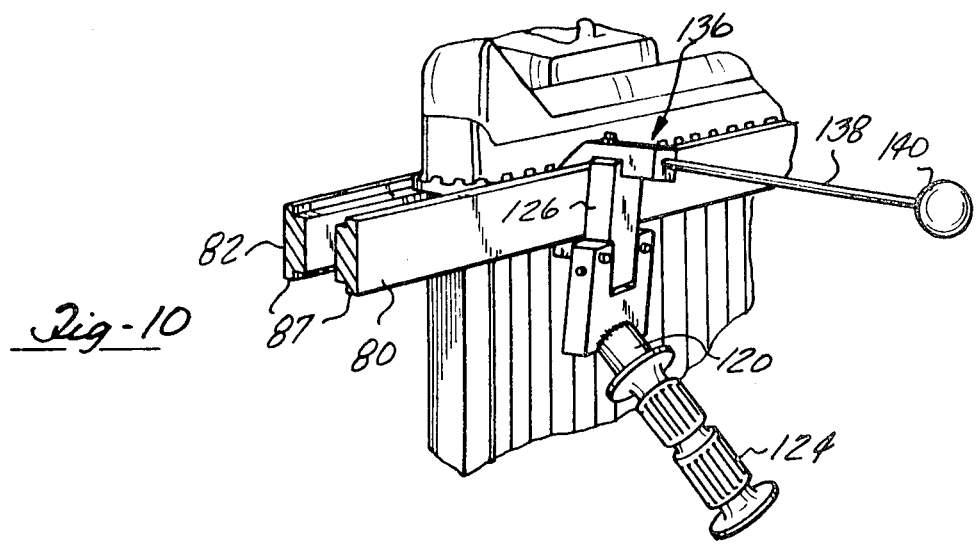
FIG. 10 is a perspective view of the crimping tool shown in FIG. 9 in use.

Recrimping of the tabs 84 is achieved by the use of a special crimping tool 118 also designed to cooperate with the rails 80 and 82 as depicted in FIGS. 9 and 10. The crimping tool 118 consists of a handle rod frame 120 welded to an angled clevis 122, the rod 120 forming a handle with a hand grip 124 mounted thereto. The clevis 122 mounts a pivot bar 126 disposed between the two clevis ends 128 with a shoulder screw 130 being provided to provide the pivotal mounts.

A channel block 132 is provided and secured with cap screws 134 across the clevis ends 128 having a channel groove 133 configured to receive the lower surface of the rails 80 or 82. On the upper end of the pivot bar 126 there is mounted a lever arm 136 consisting of a handle rod 138 having a ball grip 140 at one end. A tool steel crimping bar 142 is mounted, by means of a cap screw 144, to the pivot bar 126 such as to form a connected assembly. The crimping bar 142 includes a wedge shaped nose section 146 extending away from the pivot bar 126 in the same direction as the channel block 132 such as to enable straddling either of the support rails 80 or 82 therebetween.

For crimping, the air cylinder 40 is again pressurized with the tank and radiator in place to compress the gasket 88. As shown in FIG. 9, the repairman grasps the handle 124 of the crimping tool 118 with his right hand and positions the tool with the block 132 in with the nose section 146 in registry with a tab to be crimped. Upward pressure exerted on the lever arm 136 and downward pressure on the handle 124 with simultaneous upward rotation of the entire tool enables ready crimping of each tab 84. The end tabs are crimped with pliers or vise grips.

The imposition of a uniform pressure by the air cylinder and holder elements insures proper sealing engagement with the tank flange 90 and the seal channel during the crimping operation such that a reliable seal is obtained.

The radiator may be readily rotated facilitating the crimping of all the tabs about the periphery of the header.

It can be appreciated that the fixturing is readily adaptable to a great advantage in recoring both conventional tanks and plastic crimped tank construction, with the substitution of the rails configured for each application, and use of hand tools designed to cooperate with the specially configured rails. It has been found in practice that these operations are conducted very efficiently and effectively through the use of this equipment, which relatively simply configured, rugged in construction, highly reliable, and suitable for usage in repair shops over an extended service life.

It can also be appreciated that the fixturing may be configured in a simplified and many alternate forms, if desired, such as by eliminating the rotational mount of of the clamping fixturing.

What is claimed as novel is as follows:

1. A decrimping tool for use in crimping tabs of automotive radiators of the type including a radiator core, a header secured to said radiator core, and a tank joined to said header by a series of tabs bent over a radiator tank flange, said tabs in the crimped position extending immediately adjacent a radiator tank side wall extending generally normally to said radiator tank flange, said decrimping tool comprising a tool frame including an elongated bar section, a handle extending generally transversely from one side of said elongated bar section and an oppositely extending anchor block adjacent to the opposite end of said bar section, a spring loaded plunger slidably mounted within the lower region of said anchor block, said spring loaded plunger extending generally parallel to said bar section and adapted to protrude from either side of said anchor block, a trigger rod pivotally mounted to said bar section having a lower portion extending in the same general direction as said handle and adjacent thereto to enable simultaneous gripping of said handle and squeezing of said lower portion of said trigger rod, said trigger rod including an engagement portion extending adjacent one end of said spring loaded plunger to be extended upon compression thereof by pivoting movement of said trigger rod beyond said opposite end of said bar section; a finger extending reversely from said anchor block towards said plunger end protruding away from said opposite end of said bar section and a knob mounted atop said anchor block enabling a downward pressure to be exerted on said finger; whereby said decrimping tool may enable decrimping of said tabs by positioning said finger behind and in registry with a crimped tab, exerting downward pressure on said knob and squeezing of said trigger rod to force said finger laterally away to de-crimp said tab.

2. The decrimping tool according to claim 1 wherein said bar section is formed with an intermediate slot and wherein said trigger rod is pivotally mounted extending through said slot with said lower portion disposed extending toward said handle, said engagement portion extending away from said bar section from the opposite side thereof.

3. The decrimping tool according to claim 1 wherein said anchor block includes a mounting surface extending slightly inclined to the lengthwise direction of said bar section and further wherein said finger is formed of tool steel, and means mounting said finger to said inclined mounting surface.

4. A crimping tool for crimping tabs on automotive radiators of the type including a radiator core and a radiator header having tabs formed about the periphery thereof adapted to be crimped to retain a radiator tank having flange portions, said crimping tool adapted to be utilized with said radiator tank with a fixturing, said fixturing including a rail having a recess to dispose said radiator header below the upper surface of said rail with said tabs extending upwardly therefrom, said crimping tool comprising a handle frame; a clevis connected to said handle frame and extending therefrom; a channel block mounted to project from said clevis and engageable with a lower edge of said rail; a pivot bar extending away from said handle frame and clevis and pivotally mounted for swinging movement above said channel block; a lever rod connected to said support bar and having a grip portion extending away from said channel block and a crimping nose portion extending in the same direction as said channel block to define a space therebetween between which said rail may be received whereby said channel block may be disposed beneath said rail with said crimping nose in registry with a tab to be crimped, and manipulation of said lever rod and handle frame enabling crimping of said tab downwardly into engagement with said flange portion of said radiator tank.

5. The crimping tool according to claim 4 wherein said handle frame extends at an inclined angle with respect to said direction in which said channel block projects.

6. The crimping tool according to claim 5 further including a clevis support mounted to said handle frame, said clevis support having a pair of ends with said channel block mounted extending thereacross and wherein said pivot bar is pivotally mounted therebetween.

7. The crimping tool according to claim 6 wherein said lever rod is joined to said crimping nose portion, said crimping nose portion in turn fastened to one end of said pivot bar, said crimping nose being generally wedge-shaped.

* * * * *

UNITED STATES PATENT AND TRADEMARK OFFICE
CERTIFICATE OF CORRECTION

PATENT NO. : 4,462,146
DATED : July 31, 1984
INVENTOR(S) : Richard A. Desiro

It is certified that error appears in the above-identified patent and that said Letters Patent is hereby corrected as shown below:

Column 2, line 13, delete "fixturing device" and insert ---- fixturing ----.

Column 4, line 49, after "fixturing" insert ---- device ----.

Column 5, line 52, delete "best been" and insert ---- best seen ----.

Column 7, line 36, delete "ends" and insert ---- end ----.

Column 8, line 7, delete "wiih" and insert ---- with ----.

Column 8, line 30, after "which" insert ---- is ----.

Column 8, line 36, delete "of".

Column 9, line 23, delete "with" second occurrence and insert --- within ---.

Signed and Sealed this

Fifth Day of March 1985

[SEAL]

Attest:

DONALD J. QUIGG

Attesting Officer

Acting Commissioner of Patents and Trademarks